United States Patent
Bronstein et al.

(10) Patent No.: US 6,343,078 B1
(45) Date of Patent: Jan. 29, 2002

(54) COMPRESSION OF FORWARDING DECISIONS IN A NETWORK DEVICE

(75) Inventors: Zvika Bronstein, Ramat Efal; Gennady Dosovitsky, Rishon Letzion; Opher Yaron; Golan Schzukin, both of Tel Aviv; Ilan Shimony, Haifa, all of (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/570,254

(22) Filed: May 12, 2000

(51) Int. Cl.[7] .............................................. H04L 12/28
(52) U.S. Cl. ..................................... 370/400; 370/401
(58) Field of Search ................................. 370/400, 401

(56) References Cited

U.S. PATENT DOCUMENTS 5,764,636 A * 6/1998 Edsall ........................ 370/401
6,091,725 A * 7/2000 Cheriton et al. ............ 370/400
6,185,214 B1 * 2/2001 Schwartz et al. .......... 370/401

OTHER PUBLICATIONS

Article: "IP Switching," Aug. 16, 1997.
Network Working Group, Feb. 1997.
Article: "Tag Switching, . . . ," Cisco Systems 1998.

* cited by examiner

*Primary Examiner*—Trong Phan
(74) *Attorney, Agent, or Firm*—Paul J. Sutton; Howard Zaretsky (57) ABSTRACT

An apparatus for and a method of compressing the forwarding decision for a frame within a network device. A forwarding decision is compressed yielding a forwarding pointer that occupies far less memory space than the corresponding output port vector. The compressed forwarding pointers are stored in a forwarding table that is accessed using a hash function. A forwarding CAM is used to resolve conflicts in the hash table. The output port vectors are stored in an output port vector table that comprises a relatively small number of possible combinations of the port vector. A forwarding decision is made for each received frame by a forwarding processor in the device. The forwarding decision is represented by a compressed forwarding pointer that is stored in a table and associated with the received frame. At some later point in time, the frame is output to one or more destination ports in accordance with a corresponding output port vector. At this time, the compressed forwarding decision is expanded to an output port vector using the relatively small port vector table. In this fashion, large memories to store the actual output port vector are not needed since only a relatively short pointer to the port vector is stored rather than the port vector itself.

42 Claims, 4 Drawing Sheets

COMPRESSION OF FORWARDING DECISIONS IN A NETWORK DEVICE

FIELD OF THE INVENTION

The present invention relates generally to data communications networks and more particularly relates to an apparatus for and a method of compressing forwarding decisions in a network device.

BACKGROUND OF THE INVENTION

Currently, the number of data networks and the volume of traffic these networks carry are increasing at an ever increasing rate. The network devices that make these networks generally consist of specialized hardware designed to move data at very high speeds. Typical networks, such as Ethernet based networks, are mainly comprised of end stations, Ethernet hubs, switches, routers, bridges and gateways. ATM networks are constructed with similar network devices adapted to carry ATM traffic, e.g., ATM capable end stations, edge devices and ATM switches.

With the ever increasing user demand for faster and faster data communications, network devices have had to perform at higher and higher speeds. A primary function of many network devices is to receive frames (packets, cells, etc.) at one or more ingress ports, and forward the frame to the appropriate egress port. Accomplishing this requires that the network device make a forwarding decision about the received frame. This requires processing and memory resources to store the frame until the forwarding decision is complete and the packet is placed onto the appropriate output ports(s).

In particular, when a frame (note that the same applies to cells and packets as well), arrives at a switch, for example, typically only its header is examined and a forwarding decision is made therefrom. The application of the decision to the frame requires that the entire frame be queued to an output port. In some implementations, the frame is not scheduled for transmission until the complete frame is successively received. With this scheme, new frames destined to the same port may potentially be blocked until the previous frame is received in its entirety and is transmitted.

Moreover, if this frame is determined to be illegal, i.e. a transmission error occurred while receiving, it must be removed from the queue, which is a time consuming operation. Alternatively, considering many types of switching architectures used today, deferring the forwarding decision to after the entire frame has been received is problematic because the switch must store the frame header for a relatively long time until the entire frame is received. During this time, thousands of frames may be received until the entire frame is received and the forwarding decision made. This requires a very large amount of memory space that is typically not available in ASICs.

In prior art store and forward schemes, the frame is not queued into the output port until the entire frame is received. The forwarding decision is made in an input server after receipt of the header portion. The frame, however, is not queued to an output port until the entire frame is received. Thus, the frame header and the forwarding result must be stored until the complete frame is received.

For example, consider a network device with 64 output ports. For each frame received, a forwarding decision must be made to determine which of the output ports to forward the frame to or whether to drop the frame altogether. The decision to forward to one or more ports is indicated in a 64 bit output port vector whereby a bit is set corresponding to each port the frame is to be output to. If the forwarding decision is made after receipt of the header, than the 64 bit output port vector must be stored in a memory queue until the entire frame has been received. Once received, the output port vector is retrieved from memory and the frame is directed to the output ports indicated in the corresponding output port vector.

A disadvantage of this approach is that depending on the number of entries in the forwarding table (including the memory in the input servers and other related queues), the output port vector information can potentially consume a very large amount of memory. For example, consider a forwarding table memory having 32K entries in a network device incorporating 16 ports. The amount of memory required just to hold the output port vector information totals 32K×16 bits. The problem is compounded considering a network device incorporating 64 ports. In this case, the memory space required for storing output port vector information only is 32K×64 bits. An increase by a factor of four. Placing such a large quantity of memory in the network device is prohibitive in terms of increased cost, increased complexity, increased physical size, reduction in reliability, increased difficulty in manufacturing and test, etc. The problem is compounded as the number of ports in a device increases.

Thus, it is desirable to be able to store, in a network device, output port vector information associated with the forwarding decision made for a received frame, without the need to incorporate large amounts of memory.

SUMMARY OF THE INVENTION

The present invention provides an apparatus for and a method of compressing the forwarding decision for a frame within a network device. The invention enables a huge reduction in the amount of memory required to store forwarding decisions. The memory savings made possible by the present invention increase as the number of ports on the network device represented by the forwarding decision increases.

For illustration purposes, the principles of the present invention are described in the context of an example network device comprising an ATM edge device comprising a plurality of Ethernet ports (e.g., 64 ports) and ATM ports (e.g., 2 ports). Thus, the example device is simultaneously connected to an Ethernet network and an ATM network.

The invention is operative to compress a forwarding decision in the form of a forwarding pointer that occupies far less memory space than the corresponding output port vector. The compressed forwarding pointers are stored in a forwarding table that is accessed using a hash function. A forwarding CAM is used to resolve conflicts in the hash table. The output port vectors are stored in an output port vector table that comprises a relatively small number of possible combinations of the port vector. For example, considering 64 output ports, the port vector table may comprise only 1024 entries. Thus, software in the network device configures the port vector table with output port vectors that are in use at the moment. Thus, only the output port vectors corresponding to frames that may be received need to be stored in the port vector table.

In operation, a forwarding decision is made for each received frame by a forwarding processor in the device. The forwarding decision is represented by a compressed forwarding pointer that is stored in a table and associated with the received frame. At some later point in time, the frame is output to one or more destination ports in accordance with a corresponding output port vector. At this time, the compressed forwarding decision is expanded to an output port vector using the relatively small port vector table. In this fashion, large memories to store the actual output port vector are not needed since only a relatively short pointer to the port vector is stored rather than the port vector itself.

Optionally, a second intermediate stage lookup may be employed whereby the compressed forwarding pointer is first mapped to a forwarding extension pointer in accordance with the value of the compressed forwarding pointer. This can be used to perform additional mapping in accordance with the frame type, e.g., Ethernet unicast, ATM unicast, multicast, MPOA, etc. The second level pointer generated is then used to lookup the actual output port vector.

There is provided in accordance with the present invention a method of compressing a forwarding decision in a network device having a plurality of ports, the method comprising the steps of receiving a protocol data unit over a receive port, storing a plurality of output port vectors in a port vector table having a width corresponding to the number of output port destinations and a length sufficient to store a small subset of all possible output port vectors, storing a plurality of forwarding pointers in a forwarding table, each forwarding pointer adapted to point to an entry in the port vector table, the forwarding table having a width less than that of the port vector table and a length sufficient to simultaneously store a desired number of entries, making a forwarding decision based on the contents of the protocol data unit, the forwarding decision associated with a selected output port vector in the port vector table, storing a forwarding pointer in the forwarding table pointing to the selected output port vector, and at a later time, retrieving the output port vector in the port vector table pointed to by the forwarding pointer associated with the frame and forwarding the protocol data unit to one or more output ports in accordance with the output port vector.

There is also provided in accordance with the present invention an apparatus for compressing a forwarding decision in a network device having a plurality of ports comprising a receive port operative to receive a protocol data unit, a port vector table adapted to store a plurality of output port vectors, the port vector table having a width corresponding to the number of output port destinations and a length sufficient to store a small subset of all possible output port vectors, a forwarding table adapted to store a plurality of forwarding pointers, each forwarding pointer adapted to point to an entry in the port vector table, the forwarding table having a width less than that of the port vector table and a length sufficient to simultaneously store a desired number of entries, a forwarding decision processor operative to make a forwarding decision based on the contents of the protocol data unit, the forwarding decision associated with a selected output port vector in the port vector table, store a forwarding pointer in the forwarding table pointing to the selected output port vector, means for retrieving the output port vector in the port vector table pointed to by the forwarding pointer associated with the frame and means for forwarding the protocol data unit to one or more output ports in accordance with the output port vector.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ATM | Asynchronous Transfer Mode |
| BUS | Broadcast and Unknown Server |
| CAM | Content Addressable Memory |
| DA | Destination Address |
| ELAN | Emulation LAN |
| IP | Internet Protocol |
| LAN | Local Area Network |
| LE | LAN Emulation |
| LEC | LAN Emulation Client |
| LECS | LAN Emulation Configuration Server |
| LES | LAN Emulation Server |
| MAC | Media Access Control |
| MPOA | Multiprotocol Over ATM |
| OC | Optical Carrier |
| OVC | Output Virtual Circuit |
| PDU | Protocol Data Unit |
| SA | Source Address |
| SMS | Selective Multicast Server |
| VCI | Virtual Circuit Identifier |
| VLAN | Virtual Local Area Network |
| VPI | Virtual Path Identifier |

Description of the Invention

The present invention provides an apparatus for and a method of compressing the forwarding decision for a frame within a network device. The invention enables a huge reduction in the amount of memory required to store forwarding decision(s). The memory savings made possible by the present invention increase as the number of ports on the network device encompassed by the forwarding decision increases.

For illustration purposes, the principles of the present invention are described in the context of an example network device comprising an ATM edge device comprising a plurality of Ethernet ports (e.g., 64 ports) and ATM ports (e.g., 2 ports). Thus, the example device is simultaneously connected to an Ethernet network and an ATM network. Note, however, it is not intended that the invention be limited to the network device described herein. It is appreciated that one skilled in the networking arts may apply the present invention to numerous other types of network devices as well without departing from the spirit and scope of the invention. Note that throughout this document, references are made to Ethernet frames and ATM cells which are example protocol data units (PDUs) associated with Ethernet networks and ATM network, respectively. It is appreciated that the invention may be adapted for use in other types of networks that transmit other types of PDUs, e.g., packets.

Figure 1:
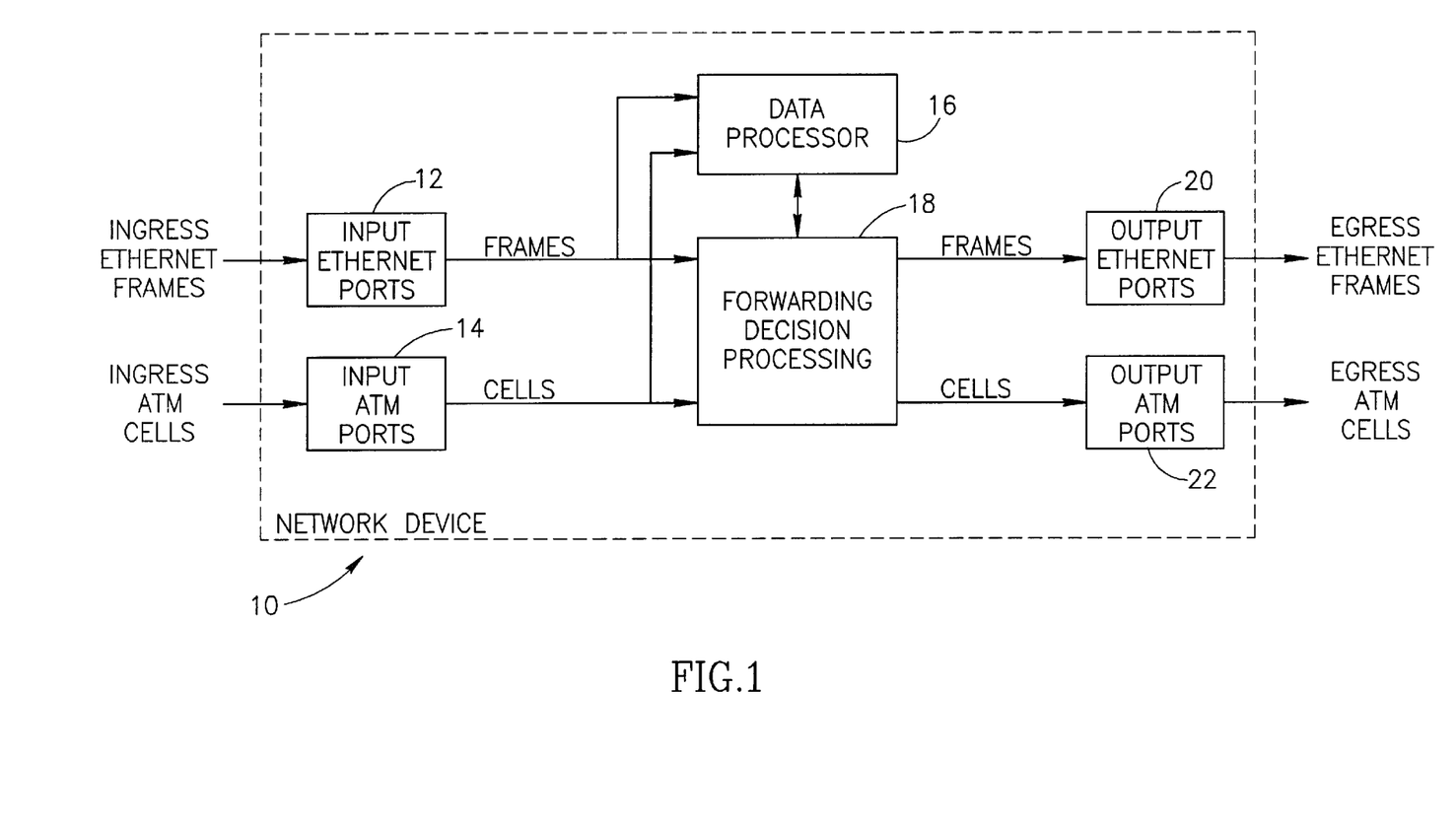
FIG. 1 is a block diagram illustrating an example network device incorporating one or more Ethernet and ATM ports.

A block diagram illustrating an example network device incorporating one or more Ethernet and ATM ports is shown in FIG. 1. The example network device, generally referenced 10, comprises an edge device for use in an ATM network. The device 10 comprises a plurality of Ethernet ports and ATM ports. In addition, the device provides standard LAN Emulation services, such as LEC, BUS, LECS, LES, SMS, etc., as defined by ATM Forum LAN Emulation standards. LAN Emulation permits Ethernet traffic to be transported across ATM circuits. For illustration purposes, the Ethernet and ATM ports in the network device have been separated into ingress and egress portions.

In particular, input Ethernet ports 12 are connected to an Ethernet network and adapted to receive ingress Ethernet frames. Similarly, input ATM ports 14 are connected to an ATM network and adapted to receive ingress ATM cells. Output Ethernet ports 20 are connected to the Ethernet network and adapted to output egress Ethernet frames. Similarly, output ATM ports 22 are connected to the ATM network and adapted to output egress ATM cells.

The Ethernet ports within the device maybe adapted to transmit and receive either 10 Mbps, 100 Mbps or 1000 Mbps Ethernet signals. The example device is also adapted to provide Layer 2 and Layer 3 switching among the Ethernet ports. Further, the device may support VLANs, multicast and MPOA protocols. A main function of the device is to forward data frames between the two types of networks, i.e. Ethernet and ATM, via the ports connected to each type of network. The Ethernet frame received may contain various parameters that are used in the forwarding process such as, for example, MAC Destination Address (DA), MAC Source Address (SA), IP DA, VLAN ID, LEC ID, ELAN ID, LE frames (received from ATM) and MPOA frames.

The device also comprises a data processor 16 and a forwarding decision processor 18. Forwarding decisions are made by the forwarding decision processor 18 that is configured dynamically by the data processor 16. Ingress Ethernet frames and ATM cells are input and processed by both the data processor 16 and the forwarding decision processor 18. In one alternative implementation of the network device, Ethernet frames on each of the Ethernet ports are segmented into ATM cells and forwarded to the appropriate destination on either the ATM or Ethernet network. If destined to an Ethernet port, the cells are assembled back into Ethernet frames before transmission through the output port.

The ATM ports, for example, may operate at 155 Mbps (OC-3) or 622 Mbps (OC-12). The Ethernet ports may operate at 10 Mbps Ethernet, 100 Mbps Fast Ethernet or 1000 Mbps Gigabit Ethernet.

Figure 2A:
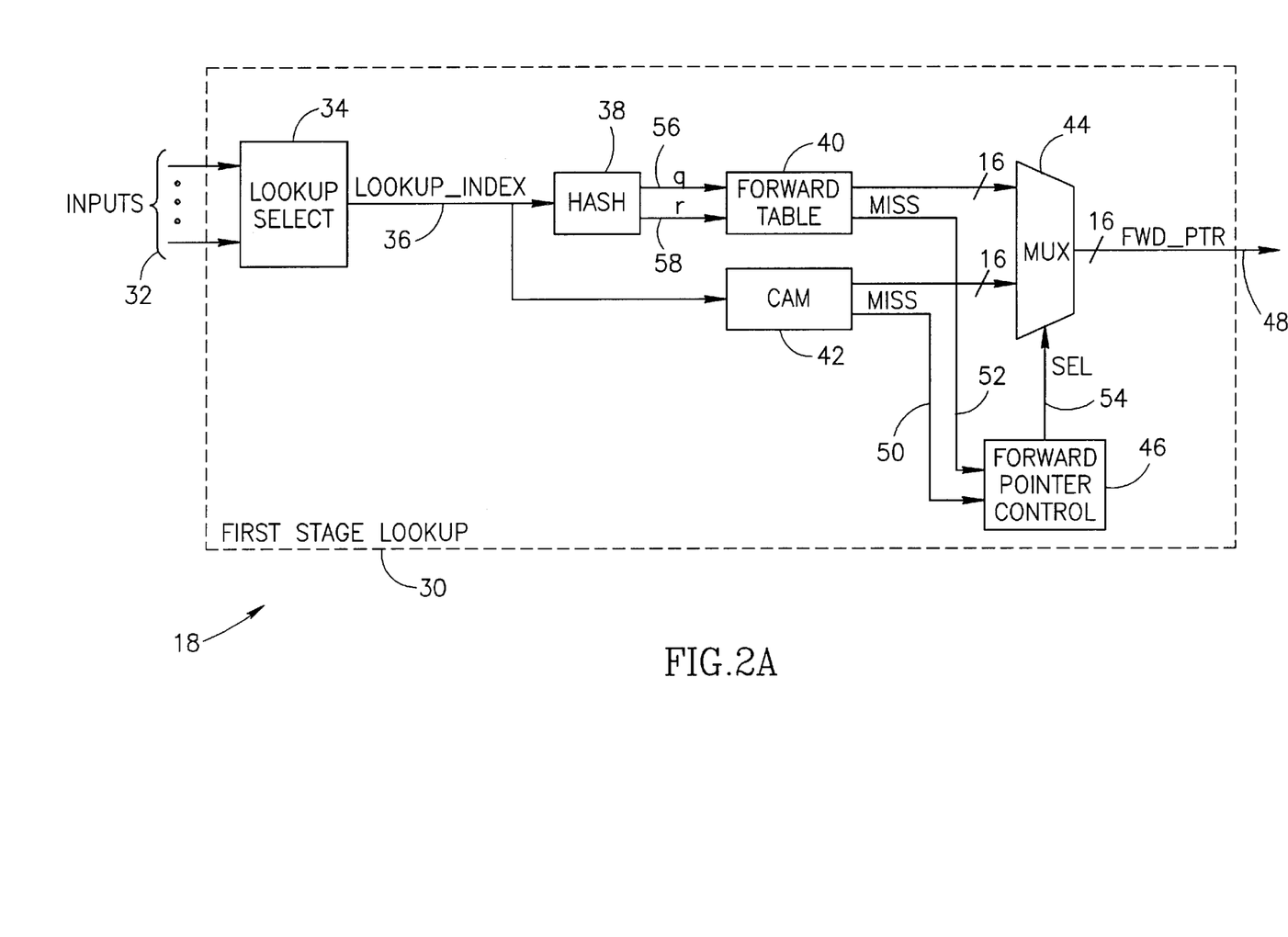
FIGS. 2A and 2B are a block diagram illustrating the multistage apparatus for compressing the forwarding decision and generating an output port vector therefrom.
Figure 2B:
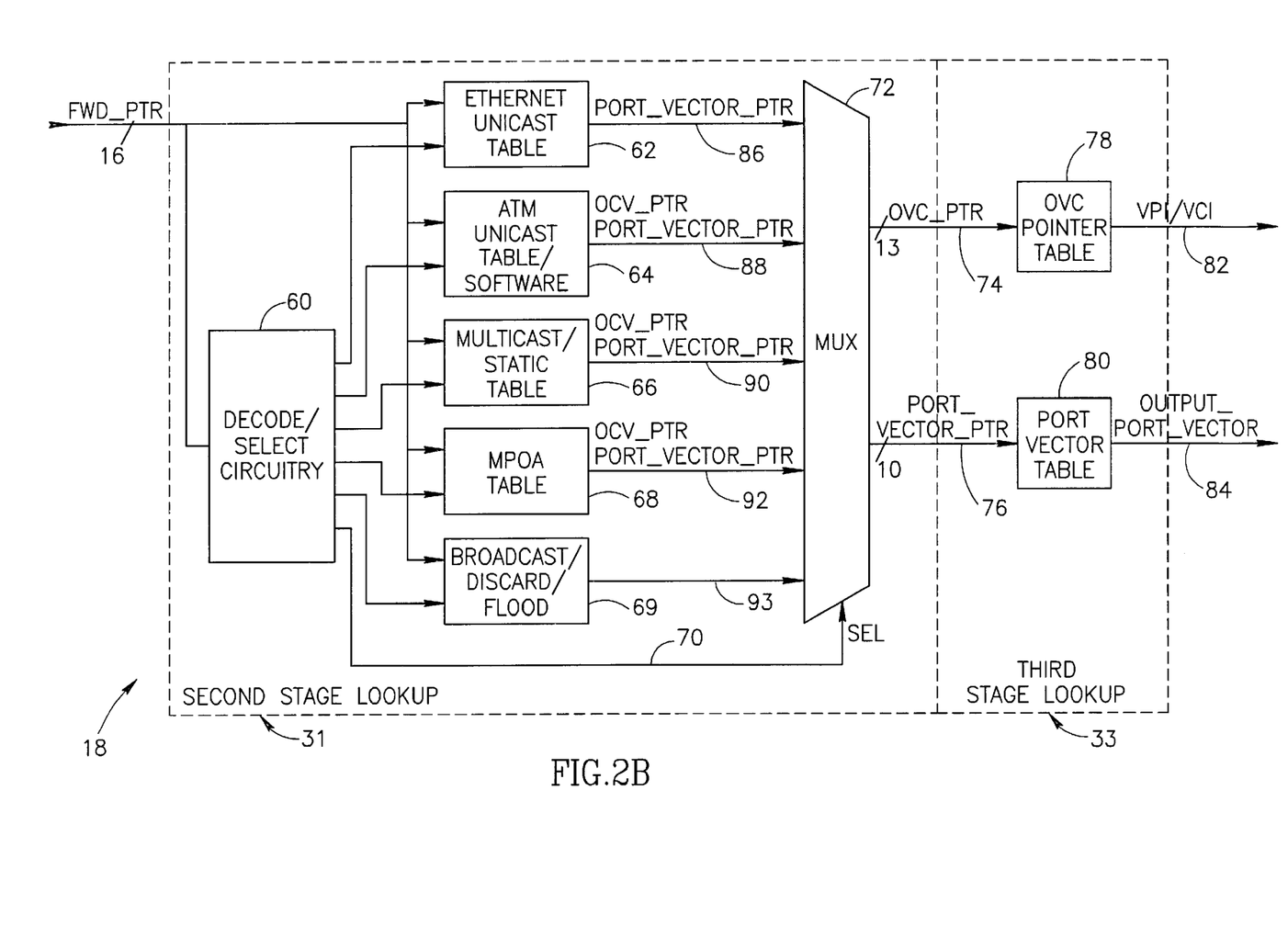

A block diagram illustrating the multistage apparatus for compressing the forwarding decision and generating an output port vector therefrom are shown in FIGS. 2A and 2B. In accordance with the present invention, the final output port vector is determined using a multistage lookup procedure. The forwarding table stores a compressed form of the output port vector, i.e. a pointer, thus greatly reducing the amount of memory required to hold the forwarding decision information. At a later stage, the pointer is translated to the actual output port vector that is used to forward the output frame. In the example implementation presented herein, the forwarding processor is apportioned into three lookup stages: a first stage lookup 30, second stage lookup 31 and a third stage lookup 33.

It is important to point out that the forwarding mechanism of the invention may utilize a plurality of input parameters 32 in making a forwarding decision. Such parameters include but are not limited to Ethernet MAC DA, Ethernet MAC SA, IP DA, VLAN ID, LEC ID, Ethernet input port, ATM input port, ingress frame type, VPI/VCI, ELAN ID and MPOA tag.

The processing of the forwarding decision is performed by the three lookup and decoding stages 30, 31 and 33. In the third and final state, the actual destination ports and virtual circuits are determined. The first stage 30 performs a forwarding table lookup and is operative to generate a first level forwarding pointer known as fwd_ptr. The second stage 31 performs decoding and lookup functions using pointer tables and is operative to generate two types of second level forwarding pointers: a port vector pointer known as port_vector_ptr and an output virtual circuit (OVC) pointer known as ovc_ptr. The third stage 33 utilizes (1) a port vector pointer table to translate the port vector pointers to actual output port vectors known as output_port_vector and (2) an OVC pointer table to translate ovc pointers to actual VPI/VCI values.

The first stage 30 comprises a lookup select 34, hash table 38, forwarding table 40, forwarding Content Addressable Memory (CAM) 42, selector (or multiplexer) 44 and forward pointer control 46. The one or more input parameters (e.g., 48 bit MAC DA, 32 bit IP DA, etc.) are input to the lookup select 34 which functions to construct a lookup_index 36 to the forwarding table. Optionally, different types of indexes may be constructed depending on the types of forwarding supported by the network device, e.g., MAC switching, MPOA ingress, MPOA egress, etc.

The lookup_index is input to a hash function 38 and a forward table CAM 42. The hash algorithm utilizes one or more polynomials to perform polynomial division of the lookup_index by the hash function. The results of the polynomial division are a quotient value 'q' 56 and a remainder value 'r' 58, both of which are input to the forwarding table 40.

The forwarding table 40 is adapted to translate the lookup_index to forwarding information comprising a forwarding pointer (referred to as fwd_ptr). The forwarding table comprises a large memory storing a hash table that stores hashed lookup_index values in a one way set associative organization. The forward CAM 42 functions to resolve conflicts in the forward hash table 40. The forwarding information comprises a compressed port vector pointer that is subsequently expanded at later point in time to an explicit output port vector. In the event the requested lookup_index is not found in the hash table 40 a miss indication signal 52 is generated. In the event the requested lookup_index is not found in the forward CAM 42 a miss indication signal 50 is generated. Both miss indication signals 50, 52 are input to the forward pointer control 46.

The compressed pointer information output by the forwarding hash table and the CAM are input to a multiplexer whose select control signal 54 is generated by the forward pointer control 46. Thus, based on the miss signals, one of the two compressed pointers forms the fwd_ptr 48 that is output of the first stage lookup 30. Note that the compressed vector may comprise any desired width. In the example presented herein, the compressed port vector width is 16 bits. Other widths, however, may also be used depending on the desired number of simultaneously available compressed pointers. The smaller the width, the fewer compressed pointer entries available at any one time. On the other hand, the larger the width, the more memory required to store the compressed pointer information. In the example presented herein, the forwarding hash table is 32K entries and the CAM comprises 2K entries.

The fwd_ptr generated by the first stage lookup 30 is input to the second stage lookup 31 where it is used as a compressed raw forwarding decision. The second stage lookup functions to map the fwd_ptr to a port vector pointer 76 (referred to as port_vector_ptr) that is then used to select the actual output ports the frame is to be transmitted on. Depending on the frame type, the fwd_ptr may also be mapped to an output virtual circuit pointer 74 (referred to as ovc_ptr).

The second stage lookup comprises one or more forwarding extension tables that store pointers related to each other by frame type. In the example presented herein, four tables are used which include: a unicast Ethernet table 62, a unicast ATM table 64, a multicast/static table 66 and an MPOA table 68. Note that the tables presented herein are only for illustration purposes. A smaller or larger number of tables may be used depending on the different frame types to be forwarded. Note that one or more of the individual tables described below may be more suited to be implemented as functions rather than tables, particularly the tables for unicast Ethernet, unicast ATM, MPOA and broadcast/discard/flood, without departing from the spirit and scope of the present invention.

The fwd_ptr is input to a decode/select circuit 60 which functions to divide the fwd_ptr into a plurality of address ranges. Each address range corresponding to a second level pointer table. Each second level table is adapted to receive the fwd_ptr itself and a select line generated by the decoder/select circuitry 60. One possible example of the mapping of forwarding pointer values, i.e., the address ranges and their corresponding frame type, is presented below in Table 1. It is appreciated that different address ranges for different frame types may also be used and are within the spirit and scope of the present invention.

TABLE 1

Example of mapping of forwarding pointer values

| Forwarding Pointer (fwd_ptr) (Hex) | Mapped to |
| --- | --- |
| 0000–003F | Ethernet ports 0 to 63 |
| 0040–0041 | Software ports 0, 1 |
| 0042–0FFF | Not Used |
| 1000–2FFF | ATM Port 0 output virtual circuits |
| 3000–4FFF | ATM Port 1 output virtual circuits |
| 5000–5FFF | Multicast, Static |
| 6000–9FFF | MPOA Ingress |
| A000–FFFB | MPOA Egress |
| FFFC | Broadcast |
| FFFD | Discard, learning |
| FFFE | Discard, no learning |
| FFFF | Flood |

The first 64 forwarding pointer values (0000 to 003F) correspond to the 64 Ethernet output ports and are mapped directly to the respective values of the port vector pointer. These are then mapped to preassigned port vector values in the port vector table 80. Forwarding pointers with a value in this range are decoded by the decode/select circuitry 60 and mapped by the Ethernet unicast table 62 which comprises 64 entries each of which, in this example, has a width of 10 bits. The 10 bit port_vector_ptr output 86 points to one of 1024 entries in the port vector table 80 in the third stage lookup 33.

The forwarding pointer values 0040 to 0041 correspond to the two software ports. Frames to be processed by the internal software are assigned one of these two pointer values. Forwarding pointers with a value in this range are decoded by the decode/select circuitry 60 and mapped by the ATM unicast/software table 64. The output 88 comprises a 10 bit port_vector_ptr pointing to one of 1024 entries in the port vector table 80 in the third stage lookup 33.

Forwarding pointer values in the range 1000 to 2FFF correspond to an ATM port 0 unicast output virtual circuit pointer (ovc_ptr). Forwarding pointers with a value in this range are decoded by the decode/select circuitry 60 and mapped by the ATM unicast/software table 64. In addition, the forwarding pointer values in the range 3000 to 4FFF correspond to an ATM port 1 unicast ovc_ptr. Forwarding pointers with a value in this range are decoded by the decode/select circuitry 60 and mapped by the ATM unicast/software table 64 which comprises 16K entries to handle the range of ATM unicast ATM forwarding pointers. Note that the output 90 comprises an ovc_ptr that is 13 bits wide and maps to one of 8K entries in the output virtual circuit (ovc) pointer table 78 in the third stage lookup 33.

Forwarding pointer values 5000 to 5FFF correspond to multicast and static frames. Each vector may designate multiple destinations to the 64 Ethernet ports, two software ports or two ATM ports. Forwarding pointers with a value in this range are decoded by the decode/select circuitry 60 and mapped by the multicast/static table 66. Note that the table is adapted to provide an output 90 comprising a 10 bit port_vector_ptr and a 13 bit ovc_ptr as well. Each output points to one of 1024 entries in the port vector table 80 and one of the 8K entries in the ovc pointer table 78, both in the third stage lookup 33. Note that the table comprises multiple forwarding decision options that may be destined to both the Ethernet and ATM networks. This includes forwarding decisions for multicast entries, i.e. Group Registration Entries (GREs) and static entries in the forwarding database within the device 10. Static entries in the forwarding database are inserted and removed by management functions.

Forwarding pointer values 6000 to 9FFF correspond to MPOA ingress forwarding decisions to ATM port 0 and ATM port 1. The input forwarding pointer is directly mapped to an ovc_ptr value and a physical ATM port via port port_vector_ptr. Forwarding pointers with a value in this range are decoded by the decode/select circuitry 60 and mapped by the MPOA table 68. Note that the table is adapted to provide an output 92 comprising a 10 bit port_vector_ptr and a 13 bit ovcptr as well. Each output points to one of 1024 entries in the port vector table 80 and one of the 8K entries in the ovc pointer table 78, both in the third stage lookup 33.

Forwarding pointer values A000 to FFFB correspond to MPOA egress forwarding decisions to one of the 64 Ethernet ports. The MPOA table 68 provides forwarding information for frames that are received from ATM MPOA shortcut VCCs with MPOA tags. The input forwarding pointer is mapped to a port_vector_ptr and an mpoa_ptr (not shown). The mpoa_ptr is used to lookup a corresponding mpoa tag from an mpoa table (not shown). Forwarding pointers with a value in this range are decoded by the decode/select circuitry 60 and mapped by the MPOA table 68. Note that the table is adapted to provide an output 92 comprising a port_vector_ptr and an mpoa_ptr as well.

Forwarding pointer value FFFC indicates a broadcast forwarding decision. In this case, the frame is to be flooded to all the ports in the VLAN, assuming the network device has this capability. In addition, the frame is flooded to the software ports as well. Forwarding pointers with this value are decoded by the decode/select circuitry 60 and mapped by the table 69. The output 93 of the table 69 is a port_vector_ptr pointer indicating which destination ports are to receive the frame.

Forwarding pointer value FFFD indicates that the frame is to be discarded when the particular address appears as the destination address. The frame is transferred to a learning queue in the software, when the address appears as the source address. Forwarding pointer value FFFE indicates that the frame is to be discarded when the particular address appears as the destination address. The frame is not transferred to a learning queue in the software, when the address appears as the source address.

Forwarding pointer value FFFF indicates a flood forwarding decision. In this case, the frame is to be flooded to all the ports in the VLAN, assuming the network device has this capability. By default, the frame is not flooded to the software unless the software port belongs to the VLAN. Forwarding pointers with this value are decoded by the decode/select circuitry 60 and mapped by the table 69. The output 93 of the table 69 is a port_vector_ptr pointer indicating which destination ports are to receive the frame.

The second level pointer information output of the tables 62, 64, 66, 68, 69 is input to a multiplexer 72 whose mux select control input is provided by the decode/select circuitry 60. Depending on the value of the forwarding pointer, the decode/select circuitry 60 is operative to generate the appropriate select line to one of the tables and the appropriate mux select control line(s) 70 to the mux 72.

The multiplexer is adapted to output a 13 bit ovc_ptr 74 and a 10 bit port_vector_ptr 76. The ovc_ptr is input to the ovc pointer table 78 and the port_vector_ptr is input to the port vector table 80, both in the third stage lookup 33. In this third stage lookup, the port_vector_ptr is mapped to the actual port vector referred to as the output_port_vector 84. Each bit in the output_port_vector corresponds to a destination port. A 10 bit port_vector_ptr enables 1024 entries in the port vector table 80. Thus, the compressed forwarding pointer generated in the first stage lookup is ultimately mapped (or expanded) to an output port vector entry in the third stage lookup. In accordance with the present invention, utilizing the compressed forwarding pointer rather than the fully expanded output port vector save a large amount of memory that would otherwise be needed to store the output port vector.

Note that the port vector table may have any suitable width to accommodate the desired destination ports. In this example, the width must accommodate 64 Ethernet output ports, two ATM ports and two software ports, making a total of 68 bits.

Similarly, the ovc_ptr is mapped to the actual VPI/VCI pair 82. A 13 bit ovc_ptr enables 8K entries in the ovc pointer table 78. Thus, the compressed forwarding pointer generated in the first stage lookup is ultimately mapped (or expanded) to an a VPI/VCI pair in the third stage lookup, if the frame is destined to an ATM port. The invention thus enables a large reduction in the memory required to store the VPI/VCI information since the compressed ovc pointer rather than the fully expanded VPIIVCI is used.

Figure 3:
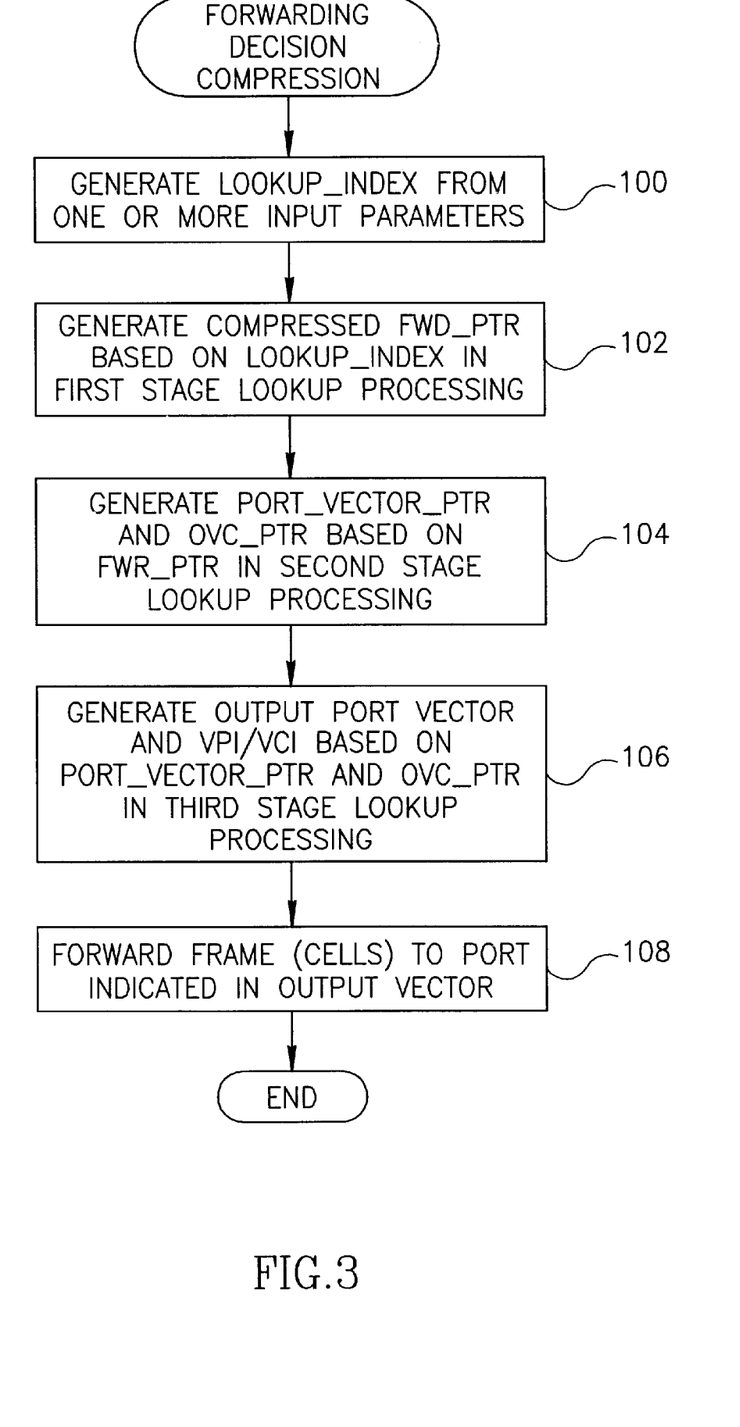
FIG. 3 is a flow diagram illustrating the method of compressing the forwarding decision and generating an output port vector therefrom.

A flow diagram illustrating the method of compressing the forwarding decision and generating an output port vector therefrom is shown in FIG. 3. Initially, the lookup_index is generated from one or more input parameters (step 100). As described previously, the input parameters may be any one or a combination of MAC DA, IP DA, LEC ID, VLAN ID, etc. Once the lookup_index is obtained, the compressed forwarding pointer (fwd_ptr) is generated based therefrom in the first stage lookup 30 (FIG. 2A) (step 102). The hash table and possibly the forward CAM are used to generate the fwd_ptr.

A second level port vector pointer and ovc pointer are then generated in accordance with the value of the compressed forwarding pointer in the second stage lookup 31 (step 104).

One or more tables are used store forwarding extensions (or second level forwarding pointers) port vector pointer (port_vector_ptr) and an ovc pointer (ovc_ptr). Decoding and select circuitry is used to determine the appropriate table to map the compressed forwarding pointer. The forwarding pointer is decoded on the basis of its value and subsequently steered to the appropriate table.

The port_vector_ptr and ovc_ptr are then mapped to the actual output port vector and ATM VPI/VCI, respectively, in the third stage lookup (step 106). A VPI/VCI pair is generated if the forwarding decision indicates one of the ATM ports. The frame (or cell) is then forwarded to the one or more ports indicated in the output vector (step 108).

Alternatively, the present invention may be implemented without three stages of lookup whereby the second intermediate stage is omitted without departing from the spirit and scope of the invention. In this case, the compressed forwarding pointer is subsequently expanded to the actual output port vector without being mapped to a forwarding extension (second level compressed forwarding pointer).

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of compressing a forwarding decision in a network device having a plurality of ports, said method comprising the steps of:

receiving a protocol data unit over a receive port;

storing a plurality of output port vectors in a port vector table having a width corresponding to the number of output port destinations and a length sufficient to store a subset of all possible output port vectors;

storing a plurality of forwarding pointers in a forwarding table, each forwarding pointer adapted to point to an entry in said port vector table, said forwarding table having a width less than that of said port vector table and a length sufficient to simultaneously store a desired number of entries;

making a forwarding decision based on the contents of said protocol data unit, said forwarding decision associated with a selected output port vector in said port vector table;

storing a forwarding pointer in said forwarding table pointing to said selected output port vector; and at a later time, retrieving the output port vector in said port vector table pointed to by the forwarding pointer associated with said frame; and forwarding said protocol data unit to one or more output ports in accordance with said output port vector.

2. The method according to claim 1, wherein said protocol data unit comprises an Ethernet frame.

3. The method according to claim 1, wherein said protocol data unit comprises an Asynchronous Transfer Mode (ATM) frame.

4. The method according to claim 1, wherein receive port comprises a port adapted to receive Ethernet frames.

5. The method according to claim 1, wherein receive port comprises a port adapted to receive Asynchronous Transfer Mode (ATM) frames.

6. The method according to claim 1, further comprising the steps of:
   decoding said forwarding pointer into a plurality of address ranges, each address range corresponding to a protocol data unit type; and
   generating an intermediate port vector pointer in accordance with said forwarding pointer, wherein said port vector pointer is used to lookup said output port vector in said port vector table.

7. The method according to claim 6, wherein said port vector pointer comprises 10 bits.

8. The method according to claim 6, wherein an address range corresponds to unicast Ethernet traffic.

9. The method according to claim 6, wherein an address range corresponds to unicast Asynchronous Transfer Mode (ATM) traffic.

10. The method according to claim 6, wherein an address range corresponds to multicast traffic.

11. The method according to claim 6, wherein an address range corresponds to static addresses.

12. The method according to claim 6, wherein an address range corresponds to Multiprotocol over Asynchronous Transfer Mode (MPOA).

13. The method according to claim 1, wherein said forwarding pointer comprises 16 bits.

14. The method according to claim 1, wherein said output port vector comprises 64 bits.

15. The method according to claim 1, further comprising the steps of:
   storing a plurality of virtual path identifier/virtual circuit identifier (VPI/VCI) pairs in an output virtual circuit table having a width sufficient to store a VPI/VCI and a length sufficient to store a subset of all possible VPI/VCI pairs;
   decoding said forwarding pointer into a plurality of address ranges, each address range corresponding to a protocol data unit type; and
   generating an intermediate output virtual circuit pointer in accordance with said forwarding pointer, wherein said output virtual circuit pointer is used to lookup a VPI/VCI pair in said output virtual circuit table.

16. The method according to claim 15, wherein an address range corresponds to unicast Asynchronous Transfer Mode (ATM) traffic.

17. The method according to claim 15, wherein an address range corresponds to multicast traffic.

18. The method according to claim 15, wherein an address range corresponds to static addresses.

19. The method according to claim 15, wherein an address range corresponds to Multiprotocol over Asynchronous Transfer Mode (MPOA).

20. The method according to claim 15, wherein said output virtual circuit pointer comprises 13 bits.

21. The method according to claim 1, wherein said forwarding decision is based on a Media Access Code (MAC) Destination Address extracted from said protocol data unit.

22. An apparatus for compressing a forwarding decision in a network device having a plurality of ports, comprising:
   a receive port operative to receive a protocol data unit;
   a port vector table adapted to store a plurality of output port vectors, said port vector table having a width corresponding to the number of output port destinations and a length sufficient to store a subset of all possible output port vectors;
   a forwarding table adapted to store a plurality of forwarding pointers, each forwarding pointer adapted to point to an entry in said port vector table, said forwarding table having a width less than that of said port vector table and a length sufficient to simultaneously store a desired number of entries;
   a forwarding decision processor operative to:
      make a forwarding decision based on the contents of said protocol data unit, said forwarding decision associated with a selected output port vector in said port vector table;
      store a forwarding pointer in said forwarding table pointing to said selected output port vector;
   means for retrieving the output port vector in said port vector table pointed to by the forwarding pointer associated with said frame; and
   means for forwarding said protocol data unit to one or more output ports in accordance with said output port vector.

23. The apparatus according to claim 22, wherein said protocol data unit comprises an Ethernet frame.

24. The apparatus according to claim 22, wherein said protocol data unit comprises an Asynchronous Transfer Mode (ATM) frame.

25. The apparatus according to claim 22, wherein receive port comprises a port adapted to receive Ethernet frames.

26. The apparatus according to claim 22, wherein receive port comprises a port adapted to receive Asynchronous Transfer Mode (ATM) frames.

27. The apparatus according to claim 22, further comprising:
   means for decoding said forwarding pointer into a plurality of address ranges, each address range corresponding to a protocol data unit type; and
   means for generating an intermediate port vector pointer in accordance with said forwarding pointer, wherein said port vector pointer is used to lookup said output port vector in said port vector table.

28. The apparatus according to claim 27, wherein said port vector pointer comprises 10 bits.

29. The apparatus according to claim 27, wherein an address range corresponds to unicast Ethernet traffic.

30. The apparatus according to claim 27, wherein an address range corresponds to unicast Asynchronous Transfer Mode (ATM) traffic.

31. The apparatus according to claim 27, wherein an address range corresponds to multicast traffic.

32. The apparatus according to claim 27, wherein an address range corresponds to static addresses.

33. The apparatus according to claim 27, wherein an address range corresponds to Multiprotocol over Asynchronous Transfer Mode (MPOA).

34. The apparatus according to claim 22, wherein said forwarding pointer comprises 16 bits.

35. The apparatus according to claim 22, wherein said output port vector comprises 64 bits.

36. The apparatus according to claim 22, further comprising:
   means for storing a plurality of virtual path identifier/virtual circuit identifier (VPI/VCI) pairs in an output virtual circuit table having a width sufficient to store a VPI/VCI and a length sufficient to store subset of all possible VPI/VCI pairs;
   means for decoding said forwarding pointer into a plurality of address ranges, each address range corresponding to a protocol data unit type; and
   means for generating an intermediate output virtual circuit pointer in accordance with said forwarding pointer, wherein said output virtual circuit pointer is used to lookup a VPI/VCI pair in said output virtual circuit table.

37. The apparatus according to claim 36, wherein an address range corresponds to unicast Asynchronous Transfer Mode (ATM) traffic.

38. The apparatus according to claim 36, wherein an address range corresponds to multicast traffic.

39. The apparatus according to claim 36, wherein an address range corresponds to static addresses.

40. The apparatus according to claim 36, wherein an address range corresponds to Multiprotocol over Asynchronous Transfer Mode (MPOA).

41. The apparatus according to claim 36, wherein said output virtual circuit pointer comprises 13 bits.

42. The apparatus according to claim 22, wherein said forwarding decision is based on a Media Access Code (MAC) Destination Address extracted from said protocol data unit.

* * * * *